(12) United States Patent
Zhang

(10) Patent No.: US 7,574,599 B1
(45) Date of Patent: Aug. 11, 2009

(54) ROBUST AUTHENTICATION AND KEY AGREEMENT PROTOCOL FOR NEXT-GENERATION WIRELESS NETWORKS

(75) Inventor: Muxiang Zhang, Malden, MA (US)

(73) Assignee: Verizon Laboratories Inc., Waltham, MA (US)

( * ) Notice: Subject to any disclaimer, the term of this patent is extended or adjusted under 35 U.S.C. 154(b) by 913 days.

(21) Appl. No.: 10/659,652

(22) Filed: Sep. 10, 2003

Related U.S. Application Data

(60) Provisional application No. 60/417,863, filed on Oct. 11, 2002.

(51) Int. Cl.
*H04L 9/00* (2006.01)
(52) U.S. Cl. .................. 713/168; 713/169; 713/170
(58) Field of Classification Search .......... 380/247–249
See application file for complete search history.

(56) References Cited

U.S. PATENT DOCUMENTS

| | | | | |
|---|---|---|---|---|
| 6,711,400 | B1* | 3/2004 | Aura | 455/411 |
| 2003/0157926 | A1* | 8/2003 | Ala-Laurila et al. | 455/406 |
| 2003/0166398 | A1* | 9/2003 | Netanel | 455/410 |

OTHER PUBLICATIONS

Pütz (Stefan Pütz, Roland Schmitz, Tobias Martin, "Security Mechanisms in UMTS", Datenschutz, and Datensicherheit (DUD), vol. 25, pp. 1-10, 2001), http://fb1.hdm-stuttgart.de/skripte/Internetsecurity_2/Papers/UMTS-SecurityMechanisms.pdf.*
Anita Singhrova, Rita Mahajan, Performance Analysis of 3G Protocol: Encryption and Authentication, http://www.comp.brad.ac.uk/het-net/tutorials/P10.pdf.*
Hung-Yu Lin and Lein Harn "Authentication Protocols for Personal Communication Systems", SIGCOMM '95 Cambridge, MA USA (1995).
Chii-Hwa Lee, Min-Shiang Hwang and Wei-Pang Yang "Enhanced Privacy and Authentication for the Global System for Mobile Communications", Wireless Networks 5 (1999) 231-243.
"Information Technology—Security techniques—Entity authentication—Part 4: Mechanisms using a cryptographic check function" International Standard ISO/IEC 9798-4, Second Edition Dec. 15, 1999.
"European digital cellular telecommunication system (phase 1); Security Related Network Functions Part 2", ETSI, GSM 03.20—EXT Version: 3.0.0, Jun. 25, 1993.
"European digital cellular telecommunication system (phase 1); Security-related Network Functions", ETSI, GSM 03.20 Version 3.3.2 (1992).
Digital cellular telecommunications system (Phase 2+); Security related network functions, ETSI, GSM 03.20 version 8.1.0 Release 1999.
Lein Harn and Hung-Yu Lin "Modifications to Enhance the Security of the GSM Protocol", Proceedings of the 5th National Conference on Information Security, Taiwan, pp. 74-76 (1995).

* cited by examiner

*Primary Examiner*—Kambiz Zand
*Assistant Examiner*—Peter Poltorak

(57) ABSTRACT

Embodiments of the invention may be used to provide an authentication and key agreement protocol that is more robust against base station, replay and other attacks compared to previously known systems. The nonce-based authentication and key agreement protocol provides security against such attacks while avoiding the problems that arise in systems that use sequence number counters on the home environment and mobile station-sides. In an embodiment, a nonce that is transmitted from the user to the home environment through the serving network, as well as subsequent values for the nonce that are derived from the initial nonce, are used as indices for authentication vectors.

15 Claims, 4 Drawing Sheets

ROBUST AUTHENTICATION AND KEY AGREEMENT PROTOCOL FOR NEXT-GENERATION WIRELESS NETWORKS

RELATED APPLICATION

The present application claims the benefit 35 U.S.C. § 119(e) of U.S. provisional patent application Ser. No. 60/417,863, filed on Oct. 11, 2002, the entirety of which is incorporated herein by reference.

FIELD OF THE INVENTION

The present invention relates to authentication and key agreement protocols in wireless communications systems. More particularly, the present invention relates to an authentication and key agreement protocol that is robust against base station, replay and other attacks and that efficiently provides for authentication in wireless systems.

BACKGROUND OF THE INVENTION

Security issues were not completely addressed properly in first-generation ("1G") analogue wireless telephone systems. With low-cost equipment, an intruder could eavesdrop user traffic or even change the identity of mobile phones to obtain fraudulent service. Given this background, a number of security measures were considered in the design of second-generation ("2G") digital cellular systems. The Global System for Mobile Communications ("GSM") system was designed from the beginning with security in mind and has adopted several mechanisms to provide subscriber identity confidentiality, subscriber authentication, and the confidentiality of user data and signaling information. The authentication and key agreement protocol ("AKA") in a GSM system is based on a secret authentication key shared between the Subscriber Identity Module ("SIM"), a smart card-like device issued by the service provider, and the authentication center ("AuC", or "HE/AuC" to designate the authentication center in the home environment) in the user's home environment ("HE"). The SIM is a removable module that acts as a security processor inside the user's terminal device. The GSM network authenticates the identity of the user through a challenge-response mechanism. The user device proves its identity by providing a response to a time-variant challenge raised by the network. Upon successful authentication, both the network and the user device also agree on a cipher key, which is used for encryption of user data and signaling information.

The GSM challenge-response mechanism is simple and has merits in several aspects. First of all, the cryptographic processing is confined to the SIM and the AuC only. Serving networks ("SN") in which the user device may travel do not require the authentication key and cryptographic algorithms to compute responses and the cipher key. This helps to minimize the trust that the home environment needs to place in the serving networks. Second, the home environment can select its own algorithms used in the challenge-response protocol; no standardized algorithms are needed. Third, the home environment is not on-line involved in most user authentication procedures. This lightens the burden on the authentication center and reduces the overhead caused by interactions between the serving network and the home environment.

Nevertheless, weaknesses of the challenge-response mechanism in GSM have been discovered over time. Above all, authentication is only unidirectional. The subscriber is not given the assurance that a connection has been established with an authentic serving network. The lack of authentication of the serving network allows the possibility of false base station attacks against the radio interface. In addition, authentication information is transferred in clear between and within networks. No assurance is provided to the user that authentication information and cipher keys are not being reused. Data integrity, which helps to defeat false base station attacks and, in the absence of encryption, provides protection against channel hijacking, is also not provided.

The Universal Mobile Telecommunication System ("UMTS") is one of the emerging standards developed for third generation ("3G") wireless communications. UMTS security is based on GSM security and includes enhancements to address and correct real and perceived weaknesses in GSM and other 2G systems. The UMTS AKA retains the challenge-response mechanism used in GSM but provides significant improvements to achieve additional goals such as mutual authentication, agreement on an integrity key between the user device and the SN, and the assurance of fresh agreed-upon cipher and integrity keys. The UMTS AKA also retains the use of a Subscriber Identity Module ("USIM", as used in the context of UMTS) as a terminal-independent security module. The authentication key is shared between and available only to the USIM and the AuC of the user's home environment.

Similar to GSM, a serving network in UMTS authenticates the user device by using authentication data (called authentication vectors) transferred from the user's home environment. It is possible for a dishonest party to intercept a transmission of such data from the home environment to the serving network. The dishonest party may then at a future time use the intercepted data to impersonate a legitimate serving network vis-à-vis the user device. One way to lower the probability of success of such an attack is for the home environment to periodically update authentication data in connection with the user and to timely inform the user device that it has performed such updates. For this purpose, a sequence number is included in each authentication vector. The user device, which independently tracks the sequence number, may verify that the sequence number in the received authentication vector matches the sequence number that it independently tracks. A mismatch may indicate that a dishonest party is replaying prior authentication data that it has intercepted. By such means, the user device may assure the freshness of agreed cipher and integrity keys. Assuring the freshness of these keys protects the user device against false base station attacks and/or replay attacks.

To facilitate sequence number generation and verification, two counters are maintained for each user: one, $SQN_{MS}$, in the mobile station and another, $SQN_{HE}$, in the home environment. Normally, the counter in the user device has a value less than or equal to the counter in the home environment. A mismatch between the two counters, e.g., a situation in which $SQN_{HE} < SQN_{MS}$, could arise, for example, from a failure in the AuC. In that event, sequence numbers generated in the home environment may not be acceptable on the user-device side. Such a "loss of synchronization" requires the execution of a re-synchronization procedure to adjust the counter in the home environment.

The UMTS system is susceptible to spurious resynchronization requests arising from the use of the two counters $SQN_{MS}$ and $SQN_{HE}$. For example, an unused authentication vector in a first SN will contain outdated values for $SQN_{HE}$ where the user device leaves the first SN for a second SN, uses authentication vectors in the second SN and subsequently returns to the first SN. In this example, when the unused authentication vector is subsequently used by the first SN, the user device will generate a spurious resynchronization request arising from the mismatch between the current value for $SQN_{MS}$ and the value for $SQN_{HE}$ corresponding to the unused authentication vector.

Re-synchronization adds extra cost to signaling and may cause deletion of unused authentication vectors corresponding to the user. Moreover, frequent resynchronization may cause the shortening of the useful life of the user device, because the user device counter $SQN_{MS}$ has a maximum value; once this maximum value is reached, the user device is rendered unusable. In fact, user devices in UMTS could be subjected to attacks specifically targeting the generation of spurious resynchronization requests with the goal of rendering the user device useless.

There is thus a need for an AKA that reduces the risk of spurious resynchronization requests arising from the use of counters in the user device and home environment. Such an AKA should nevertheless provide assurance regarding the freshness of agreed cipher and integrity keys. In particular, such an AKA should continue to provide robust protection against replay and/or false base station attacks, or even improve such protection compared to known systems.

SUMMARY OF THE INVENTION

Embodiments of the invention may be used to provide an authentication and key agreement protocol that is more robust against base station, replay and other attacks compared to previously known systems. Embodiments of the invention may reduce the probability of spurious resynchronization requests. Further, greater interoperability with authentication centers provided by multiple vendors may be possible in embodiments of the invention.

In one aspect of the invention, a method is provided for facilitating authentication in a wireless network. In this method, an initial nonce value, which originated from a user device, is received from a serving mobile network in an authentication data request associated with the user device. A subsequent nonce value is generated from the initial nonce value based on a function that is shared with the user device. An authentication vector is generated that includes the subsequent nonce value and that is associated with the user device. The authentication vector is transmitted to the serving mobile network.

In another aspect of the invention, a method is provided for facilitating authentication in a wireless network. In this method, an initial nonce value is received from a user device. The initial nonce value is transmitted to a home environment associated with the user. An authentication vector that includes a subsequent nonce value derived from a function that is shared by the user device and the home environment is received from the home environment. The authentication vector is transmitted to the user device.

In another aspect of the invention, a method is provided for facilitating authentication in a wireless network comprising generating an ordered set of sequence numbers wherein: i) each sequence number in the ordered set is associated with an authentication vector transmitted to a serving network in connection with authentication of the serving network to a user device; ii) an initial sequence number in the ordered set is obtained from the user device through the serving network; and iii) a subsequent sequence number in the ordered set is equal to the result of evaluating a function shared by the user device with a previous sequence number in the ordered set as input.

In another aspect of the invention, a method is provided for facilitating authentication in a wireless network comprising receiving an ordered set of sequence numbers wherein i) each sequence number in the ordered set is associated with an authentication vector received from a home environment corresponding to a user device in connection with authentication to the user device; ii) an initial sequence number in the ordered set originated from the user device; and iii) a subsequent sequence number in the ordered set is equal to the result of evaluating a function shared by the user device and the home environment with a previous sequence number in the ordered set as input.

Other aspects of the invention are disclosed and discussed in the following written description, drawings and claims, including apparati and computer-readable media capable of performing methods of the invention.

DETAILED DESCRIPTION OF THE INVENTION

Embodiments of the invention provide assurance regarding the freshness of ciphers exchanged during authentication of a user device in a mobile network without requiring the use of counters for this purpose. Embodiments of the invention, by eliminating the use of counters, also avoid the problems arising from the requirement to synchronize such counters.

Figure 1:
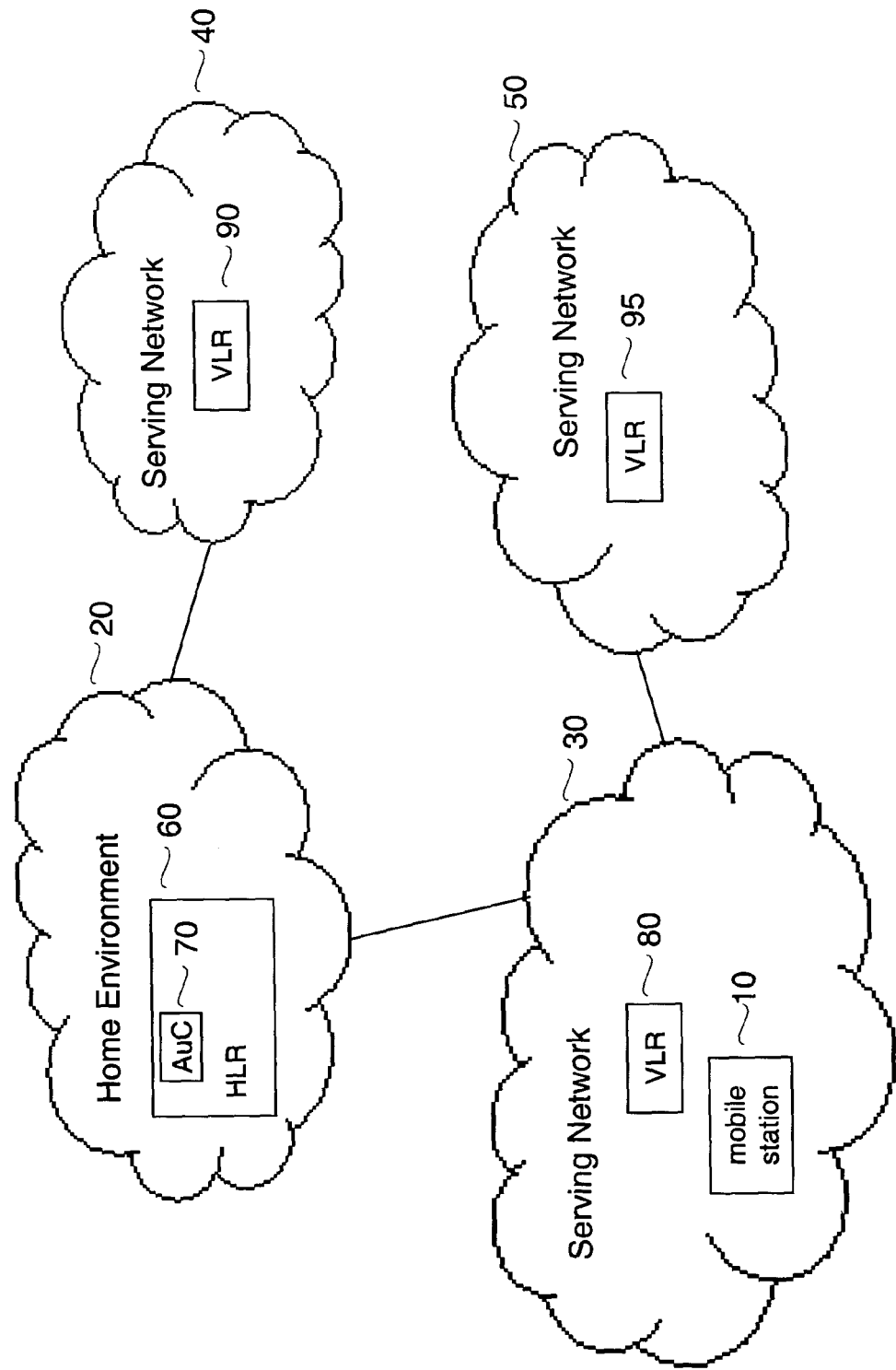
FIG. 1 shows an example of a communications network that may be used with embodiments of the present invention.

FIG. 1 shows an example of a wireless communications network that may be used with embodiments of the present invention. The network of FIG. 1 includes a number of individual wireless networks, namely, Home Environment 20, Serving Network 30, Serving Network 40 and Serving Network 50. Home Environment 20 is the home environment network for Mobile Station 10, which is shown in FIG. 1 as roaming in Serving Network 30. In FIG. 1, Serving Network 30 and Serving Network 40 are directly connected to Home Environment 20, whereas Serving Network 50 is connected to Home Network 30 through Serving Network 30. Although the network of FIG. 1 is shown as comprising four individual wireless networks, in general, any number of networks connected in accordance with known topologies may be used in embodiments of the invention.

In FIG. 1, Home Environment 20 contains Home Location Register ("HLR") 60, which is a functional unit that is responsible for managing mobile subscribers. Home Location Register 60 may include, among other things, a database containing subscriber identification information. For example, Home Location Register 60 may contain subscriber identification information corresponding to Mobile Station 10. Home Location Register 60 may also include Authentication Center ("AuC") 70, which manages the authentication of subscribers and performs encryption functions. Additionally, each of Serving Network 30, Serving Network 40 and Serving Network 50 contain a location register; in FIG. 1, these are Visiting Location Register ("VLR") 80, VLR 90 and VLR 95, respectively.

In some embodiments of the invention, the General Packet Radio Service ("GPRS") may be used to provide communications of data at high rates and in an efficient manner through one or more networks. As known to one skilled in the art, GPRS overlays a packet-based interface on top of an underlying circuit-switched network, and thus eliminates the need to dedicate circuits to users. Because of this feature, the available services may easily be extended to include Internet services in a GPRS-capable network. Each network of FIG. 1 may be a GPRS-capable network whose location register (either the Home Location Register or the Visiting Location Register) additionally includes a Serving GPRS Support Node ("SGSN") that provides mobility management, IP packet session management and the management of Call Data Record generation for billing purposes. However, networks that are not GPRS-capable may also be used with embodiments of the invention.

In FIG. 1, a user registered with Home Environment 20 is shown as being within the network area of Serving Network 30 with the user communications device, Mobile Station 10. In general, the user may wander and roam throughout the networks shown in FIG. 1 with the user device, Mobile Station 10.

For purposes of illustration only, this written description considers the use of an embodiment of the invention with UMTS. However, any known wireless communications system standard may be used with embodiments of the invention.

1. Authentication and Key Agreement Protocol in UMTS

Figure 2:
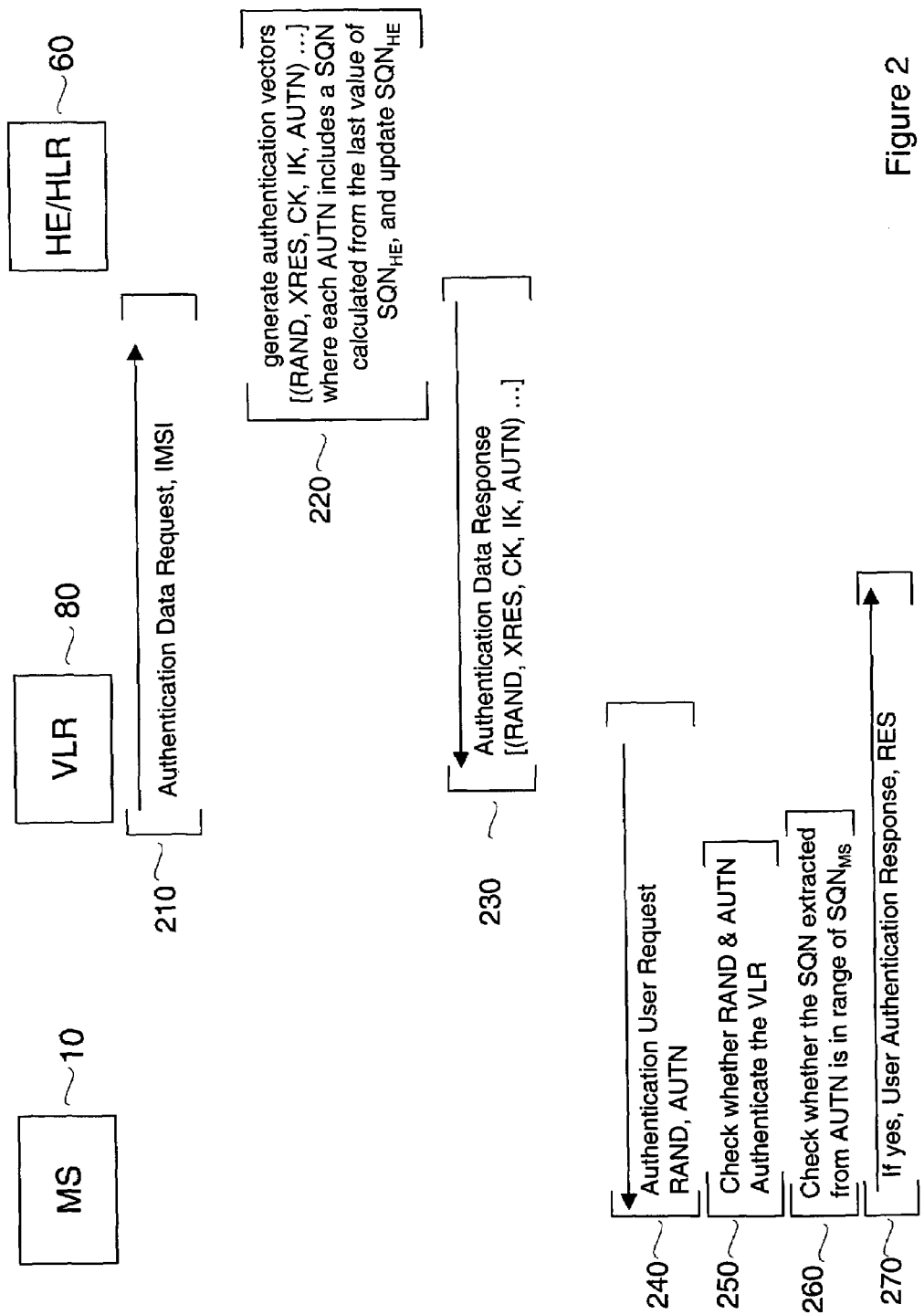
FIG. 2 shows a flow diagram of the authentication and key agreement protocol of the UMTS standard.

The user device and the serving network achieve mutual authentication in the UMTS AKA based on a secret key "k" which is shared between and usually available only to the USIM in the mobile station ("MS") and the authentication center in the user's home environment. In addition, the HE keeps track of a counter $SQN_{HE}$ for each user device registered with the HE. The user device's USIM also keeps track of a counter, $SQN_{MS}$. An overview of the UMTS AKA protocol is shown in FIG. 2, and is described below.

1.1 Distribution of Authentication Data from HE to SN

The visiting location register ("VLR"), which may include a SGSN in embodiments where the corresponding network is GPRS-capable, after detecting the presence of a mobile station, invokes the procedure by requesting authentication data from the HE/AuC in connection with the mobile station. For example, as shown in step 210 of FIG. 2, Visiting Location Register 80 of FIG. 1 may detect that Mobile Station 10 has entered the area covered by Serving Network 30, and may request authentication data in connection with the user of Mobile Station 10 from Home Location Register 60 in the user's Home Environment 20. The Authentication Data Request may include the International Mobile Station Identifier ("IMSI") corresponding to Mobile Station 10. Upon receipt of the Authentication Data Request, the HE/AuC may at step 220 generate authentication vectors and at step 230 send VLR 80 an Authentication Data Response including an ordered array of authentication vectors. Each authentication vector, also called a quintet (the equivalent of a GSM "triplet"), consists of five components: a random challenge RAND, an expected response XRES, a cipher key CK, an integrity key IK, and an authentication token AUTN. Each quintet is generated in step 220 using the following procedure:

(a) The HE/AuC generates a fresh sequence number SQN from the counter $SQN_{HE}$ and an unpredictable random number RAND.

(b) The HE/AuC then computes the following values:

a message authentication code $MAC = f1_k(SQN, RAND, AMF)$, where $f1(k, SQN, RAND, AMF)$ is a message authentication function, $f1_k(SQN, RAND, AMP) = f1(k, SQN, RAND, AMF)$, and k is a secret key shared by Mobile Station 10 and Home Environment 60;

an expected response $XRES = f2_k(RAND)$, where $f2$ is a (possibly truncated) message authentication function, and $f2_k = f2(k, RAND)$;

a cipher key $CK = f3_k(RAND)$, an integrity key $IK = f4_k(RAND)$, and an anonymity key $AK = f5_k(RAND)$, where $f3, f4$, and $f5$ are key generating functions, and $f3_k = f3(k, RAND)$, $f4_k = f4(k, RAND)$ and $f5_k = f5(k, RAND)$.

(c) Finally the HE/AuC assembles the authentication token $AUTN = SQN \oplus AK \| AMF \| MAC$ and the quintet $Q = (RAND, XRES, CK, IK, AUTN)$, and updates the counter $SQN_{HE}$. Here, "⊕" denotes the XOR operation, whereas "∥" denotes concatenation.

In each authentication vector, an authentication and key management field AMF may be included, which may be used to define operator-specific options in the authentication process, e.g., the use of multiple authentication algorithms or a limitation of key lifetime.

The functions $f, f2, f3, f4$, and $f5$ are functions that are each known to the mobile station and the HLR/AuC. These functions, for example, may be UMTS-standard functions as described in Cryptographic Algorithm Requirements (Release 1999), 3GPP TS 33.105 V.3.6.0 (2000-12), the entirety of which is incorporated herein by reference. Further, CK, IK and AK may be a UMTS-standard cipher key, a UMTS-standard integrity key and a UMTS-standard anonymity key as described in the same document.

1.2 Authentication and Key Agreement

The VLR invokes the procedure by selecting the next unused authentication vector from the ordered array of authentication vectors in the VLR database. Each authentication vector is good for one authentication and key agreement between the VLR and the USIM. At step 240 of FIG. 2, the VLR 80 sends to the USIM the random challenge RAND and the authentication token AUTN from the selected authentication vector.

Upon receipt of RAND and AUTN, the USIM of Mobile Station 10 at step 250 computes the anonymity key $AK = f5_k(RAND)$ and retrieves the sequence number $SQN = (SQN \oplus AK) \oplus AK$. Then, the USIM computes the expected $XMAC = f1_k(SQN, RAND, AMF)$ and compares this with the MAC included in AUTN. If they are different, the USIM sends User Authentication Reject back to the VLR with an indication of the cause and the user device abandons the procedure. In this case, the VLR sends an Authentication Failure Report message to the HE/AuC.

If the computed XMAC matches the MAC in AUTN as determined in step 250, the USIM at step 260 then verifies if the received sequence number SQN is in a range acceptable to the USIM. If the USIM considers the sequence number to not be in the correct range, it sends a Synchronization Failure Message back to the VLR including a re-synchronization token AUTS, and abandons the procedure. The re-synchronization token AUTS has the form $Conc(SQN_{MS}) \| MAC\text{-}S$, where $Conc(SQN_{MS}) = SQN_{MS} \oplus f5_k(RAND)$ is the concealed value of the counter $SQN_{MS}$ in the USIM, and $MAC\text{-}S = f1_k^*(SQN_{MS}, RAND, AMF)$ where RAND is the random value received in the current user authentication request, $f1^*$ is a message authentication function and $f5^*$ is a key generating function.

If the USIM determines that the sequence number SQN is in an acceptable range however, the USIM at step 270 computes $RES = f2_k(RAND)$, and includes RES in a User Authentication Response back to VLR 80. Next, the USIM sets $SQN_{MS}$ equal to SQN, if $SQN_{MS}<SQN$. Finally, the USIM computes the cipher key $CK=f3_k(RAND)$ and the integrity key $IK=f4_k(RAND)$.

Upon receipt of the user authentication response, the VLR compares RES with the expected response XRES from the selected authentication vector. If XRES equals RES, then the authentication procedure is deemed to have been completed successfully. The VLR also selects the cipher key CK and integrity key IK from the selected authentication vector for communications with Mobile Station 10. If, on the other hand, XRES and RES are different, the VLR sends an Authentication Failure Report to the HE.

2. Problems in UMTS Arising from the Use of the Sequence Number Counters

There are a number of problems that may arise in UMTS because of the use of the two counters:

2.1 Spurious Re-Synchronization Requests

A mismatch between the two counters, e.g., $SQN_{HE}<SQN_{MS}$, may cause the USIM to reject sequence numbers generated by the HE/AuC. Under such circumstances, an adjustment to the value of $SQN_{HE}$ is needed to resynchronize the HE/AuC. In the UMTS AKA, re-synchronization requests are initiated by the USIM, not by the E/AuC. This increases the probability of spurious re-synchronization requests. Whenever a sequence number is considered to not be in the correct range, the USIM decides that a synchronization failure has occurred in the HE/AuC, and consequently sends a re-synchronization request to the HE/AuC. Spurious re-synchronization requests may occur with a higher probability in such a system, because the user device may not be in a position to determine when a mismatch arises from a legitimate security concern.

The fact that a sequence number is not in the correct range does not necessarily mean a failure in the counter $SQN_{HE}$. It may be caused by the replay of a used authentication vector or even by the out-of-order use of authentication vectors in the VLR. Spurious re-synchronization adds extra cost to signaling and may cause deletion of unused authentication vectors corresponding to the user.

2.2 Out-of-Order Use of Authentication Vectors

To ensure that the rate of re-synchronization requests is sufficiently low in the USIM, mechanisms for verifying the freshness of sequence numbers should to some extent allow the out-of-order use of authentication vectors. Authentication vectors may be used out of order in the following scenarios:

In a first scenario, an array of authentication vectors may arrive at the SN out of order, i.e., the initial ordering of the authentication vectors may be disturbed on their way from the HE to the SN. As the sequence numbers are concealed by the anonymity key, the SN cannot restore the original ordering.

In a second scenario, user movement between VLRs that do not exchange authentication information may cause out of order use of authentication vectors. When the user returns to a previously visited $VLR_o$ (corresponding to $network_o$) from a newly visited $VLR_\pi$ (corresponding to $network_\pi$), authentication and key agreement procedures based on unused authentication vectors in $VLR_o$ may cause synchronization failures. In such a case, all the unused authentication vectors in $VLR_o$ may be deleted after a new batch of authentication vectors are received by $VLR_o$. For example, in a possible sequence of events, a batch of ten authentication vectors is served to $VLR_o$ (for mutual authentication of Mobile Station 10 and $VLR_o$) when Mobile Station 10 first enters the geographic area of $network_o$. Assuming initially that $SQN_{HE}=SQN_{MS}=1$, the counters will have the values $SQN_{HE}=SQN_{MS}=11$ after the batch is served to $VLR_o$. In this example, Mobile Station 10 then leaves the geographic area of $network_o$ and enters the geographic area of $network_\pi$ after having used only two of the ten authentication vectors that had been served to $VLR_o$. Assuming a new batch of ten authentication vectors is served to $VLR_\pi$ in connection with the mutual authentication of Mobile Station 10 and $VLR_\pi$, the counters at Mobile Station 10 and the HE/AuC will then have the values $SQN_{MS}=21$ and $SQN_{HE}=21$, respectively. Mobile Station 10 then returns to $network_o$ after having used all ten authentication vectors in the second batch while located in $network_\pi$. At this point, $VLR_o$ may serve the third authentication vector of the first batch, which had not been used during the first sojourn of Mobile Station 10 in $network_\pi$, to Mobile Station 10. However, Mobile Station 10 will detect a mismatch between the value of the counter in Mobile Station 10, that is, $SQN_{MS}=21$, and the value of the counter at HE as detected by Mobile Station 10 from reading the third authentication vector (from the first batch) that was served to it; that is, Mobile Station 10 will detect that $SQN_{HE}=3$ based on reading the third authentication vector of the first batch that is served when Mobile Station 10 enters $network_o$ for the second time. This mismatch may cause Mobile Station 10 to initiate a resynchronization procedure in which the unused authentication vectors of the first batch may also be discarded, even though no attempt to breach security (e.g., by means of a false base station attack or replay attack) had occurred.

Annex C of the 3GPP Technical Specification 33.102, Security Architecture, Version 4.2.0, Release 4, which is herein incorporated in its entirety by reference, describes an array mechanism to support the out-of-order use of authentication vectors. With this mechanism, the HE/AuC allocates an index value to each authentication vector and includes it in the sequence number. The USIM maintains an array of previously accepted sequence numbers. If the received sequence number SQN is not larger than the sequence number in the array which has the same index value as SQN, then the USIM considers SQN to not be in the correct range; otherwise the USIM considers SQN to be in the correct range and updates the array. Due to the finite array size, however, the array mechanism supports the out-of-order use of authentication vectors only to a limited extent.

2.3 Wrap Around of the Counter $SQN_{MS}$

The maximum value SEQ, of $SQN_{MS}$ is finite as the size of sequence numbers is limited. When the counter $SQN_{MS}$ reaches its maximum value, the USIM will be locked out permanently, and cannot be re-activated even if the AuC resets the value of $SQN_{HE}$ for the user. Thus, if an attacker had the means of setting the counter $SQN_{HE}$ to its maximum value or even to a value much larger than the current value, then the risk of locking out the USIM would be very high. This would be possible if the attacker could forge authentication data requests and flood them to the HE/AuC through an unprotected public land mobile network ("PLMN"). Furthermore, a software error or an operational error may also cause the counter $SQN_{HE}$ to be set too high. The risk of USIM lock-out poses severe requirements on the generation and management of sequence numbers.

2.4 Active Attacks in Unprotected PLMN

In GSM, cipher keys and authentication data are transferred unprotected via signaling networks. This was formerly perceived not to be a serious problem since the signaling networks, which are under the control of a small number of large institutions, were considered to be isolated from the publicly accessible network elements. This is no longer the case with the rapid convergence of circuit-switched and packet-switched data networks. Although mechanisms are currently being developed to provide network domain security, including security for the Mobile Application Part ("MAP") protocol used with GSM, it is unlikely that network-wide security or MAP security will be implemented in every PLMN at the same time, unless network operators can agree otherwise. This state-of-affairs fosters active attacks in unprotected PLMNs and impedes the normal operation of the authentication and key agreement protocol. In an unprotected PLMN, the attacker may forge an authentication data request message to obtain authentication vectors for any user of any PLMN, independent of the actual location of the user. In this way, the attacker may obtain an arbitrary number of fresh authentication vectors. These fresh authentication vectors can be used to mount false base station attacks or even be used to impersonate legitimate users. In addition, the attacker could force the counter $SQN_{HE}$ in the HE/AuC to become large enough to cause USIM lock-out by simply flooding authentication data requests.

3. Nonce-Based Authentication and Key Agreement

In an embodiment of the present invention, a nonce provided by a user device is used in the generation of authentication vectors within the framework of the UMTS AKA instead of sequence numbers based on counters at the mobile station and the HE/AuC.

3.1 Distribution of Authentication Vectors from HE to SN

VLR 80 may invoke the procedure by sending a User Nonce Request to the MS/USIM 10. As shown in step 310 of FIG. 3, a random number, FRESH, may be included in the request. After receiving the request, MS/USIM 10 at step 320 may generate a random number $RAND_{MS}$ and compute the message authentication code:

$$MAC_{MS} = f1_k(FRESH, RAND_{MS}).$$

The MS/USIM 10 at step 320 may also send a User Nonce Response back to VLR 80 that includes $RAND_{MS}$ and $MAC_{MS}$.

Upon receipt of $RAND_{MS}$ and $MAC_{MS}$, VLR 80 at step 330 sends an Authentication Data Request message to HE/AuC 70, with IMSI, FRESH, $RAND_{MS}$ and $MAC_{MS}$ included in the message. Upon receipt of the Authentication Data Request message from VLR 80, HE/AuC 70 at step 340 retrieves FRESH and $RAND_{MS}$ from the message. Then, HE/AuC 70 computes the expected message authentication code $XMAC_{MS} = f1_k(FRESH, RAND_{MS})$. If $XMAC_{MS}$ is not equal to $MAC_{MS}$, HE/AuC 70 abandons the procedure; otherwise HE/AuC 70 at step 340 generates an ordered array of authentication vectors and sends them back to VLR 80 at step 350.

In the generation of authentication vectors at step 340, HE/AuC 70 keeps track of the value of a variable NONCE. Initially, the value of NONCE is equal to the random number $RAND_{MS}$ provided by the user. To generate an authentication vector, HE/AuC 70 first computes $NONCE_{new} = f5_k(NONCE)$ and then updates the value of NONCE by $NONCE_{new}$. Next, HE/AuC 70 generates an unpredictable challenge RAND and computes the following values: (i) a message authentication code $MAC = f1_k(NONCE, IND, RAND, ID_{SN}, AMF)$, where IND, with values starting from zero, denotes the order of the authentication vector in the array, and $ID_{SN}$ denotes the identity of the serving network; (ii) an expected response $XRES = f2_k(RAND)$; (iii) a cipher key $CK = f3_k(RAND)$; and (iv) an integrity key $IK = f4_k(RAND)$. Finally, HE/AuC 70 assembles the authentication token AUTN=NONCE||IND||AMF||MAC and the vector quintet Q=(RAND, XRES, CK, IK, AUTN). HE/AuC 70 may assemble a batch of authentication vectors (comprising one or more authentication vectors) and send them to VLR 80 in step 350.

3.2 Authentication and Key Agreement

VLR 80 invokes this procedure by selecting the next authentication vector from the ordered array of authentication vectors in the VLR database. VLR 80 at step 360 sends to the USIM the random challenge RAND and the authentication token AUTN from the selected authentication vector. Upon receipt of RAND and AUTN, the USIM of MS 10 in step 370 retrieves NONCE and IND from AUTN. The USIM in step 370 also computes $XMAC = f1_k(NONCE, IND, RAND, ID_{SN}, AMF)$ and compares it with the MAC included in AUTN. If they are different, the USIM sends User Authentication Reject back to the VLR with an indication of the cause and abandons the procedure. VLR 80, in turn, sends an Authentication Failure Report message to HE/AuC 70. VLR 80 may also decide to initiate a new authentication procedure in connection with the user.

If the XMAC computed by the USIM in step 370 is equal to the MAC included in the AUTN, the USIM then checks at step 380 whether the NONCE included in AUTN is acceptable. One example of a determination of whether NONCE is acceptable is discussed further below. If the NONCE is considered unacceptable, the USIM sends User Authentication Reject back to VLR 80 with an indication of the cause and abandons the procedure. If the NONCE is considered to be acceptable, however, the USIM computes $RES = f2_k(RAND)$ and includes this parameter in a User Authentication Response message, which is sent back to VLR 80. Next, the USIM computes the cipher key $CK = f3_k(RAND)$ and the integrity key $IK = f4_k(RAND)$.

Upon receipt of the User Authentication Response, VLR 80 compares RES with the expected response XRES from the selected authentication vector. If RES is equal to XRES, then the user is deemed to have been successfully authenticated. The VLR also selects the corresponding cipher key CK and integrity key IK from the selected authentication vector. If RES is not equal to XRES, VLR 80 sends an Authentication Failure Report message to HE/AuC 70. The VLR in that case may also decide to initiate a new authentication procedure in connection with the user.

3.3 Nonce Verification and Management in USIM

In an exemplary embodiment of the invention, HE/AuC 70 generates a sequence of nonces for use as sequence numbers for the authentication vectors in a batch. The nonces in a batch are derived from the random number $RAND_{MS}$ provided by the user. Upon completion of authentication vector generation, HE/AuC 70 may delete the random number $RAND_{MS}$. To generate a new batch of authentication vectors, HE/AuC 70 uses another random number provided by the user. This ensures that synchronization is not needed in the generation of authentication vectors. To verify the freshness of an authentication vector, the USIM at step 380 computes a nonce, initially based on the random number $RAND_{MS}$ and thereafter using the previous value of the nonce (using a function and the secret key known to both the USIM and the HLR/AuC), and compares the computed nonce with the NONCE included in the AUTN. If they are equal, the USIM accepts NONCE; otherwise it rejects NONCE. This also guarantees, in this exemplary embodiment, that USIM lock-out will not happen regardless of the value of the received NONCE. Moreover, the management of nonces is confined to the USIM only; this feature enables interoperability of this embodiment of the invention with authentication centers provided by multiple vendors.

Figure 3:
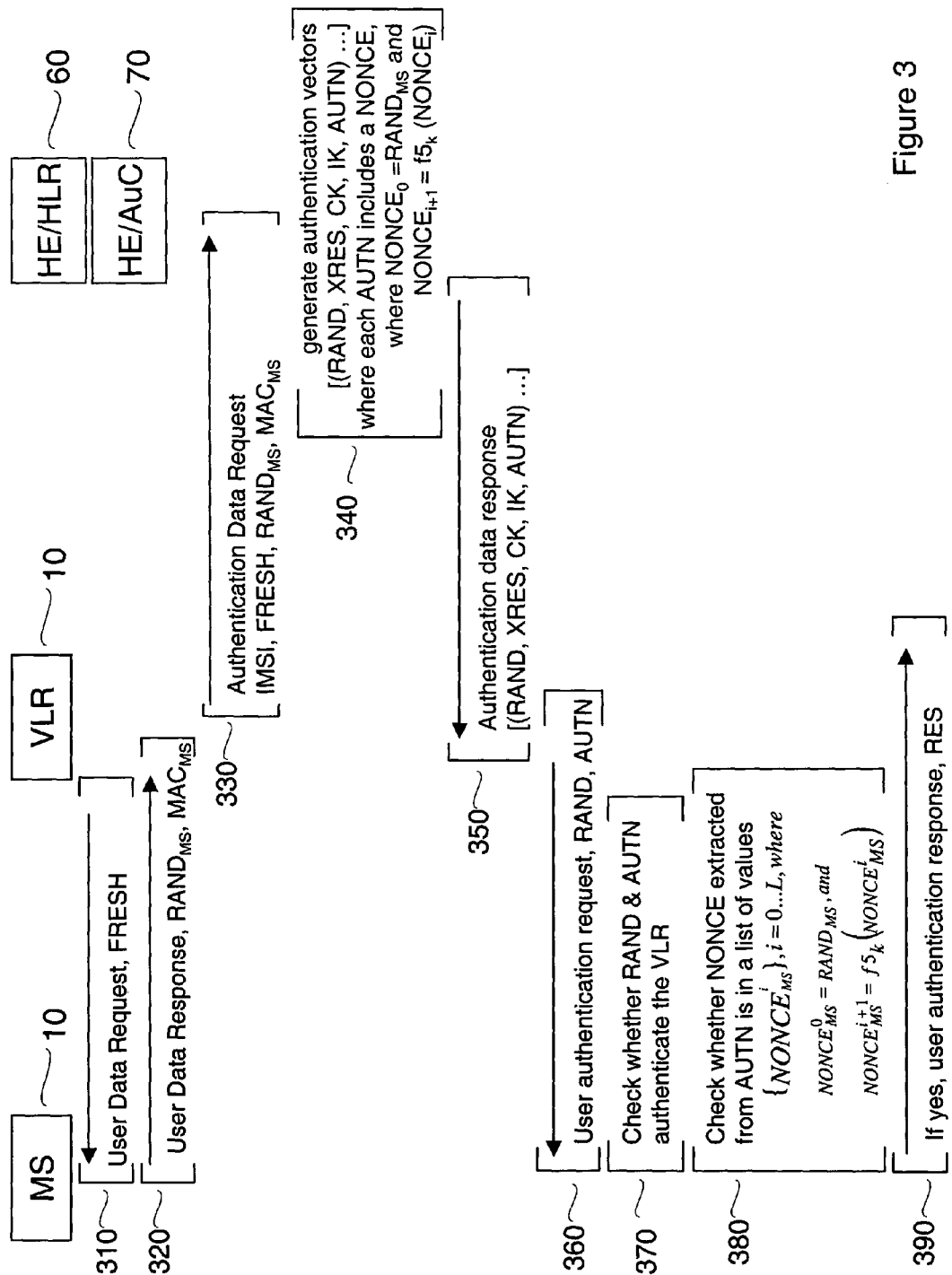
FIG. 3 shows a flow diagram of an authentication and key agreement protocol that incorporates an embodiment of the present invention in which counters are not used to assure the freshness of cipher and integrity keys.

In another exemplary embodiment, unused nonces are buffered in a scheme that provides a procedure, in step 380 in FIG. 3, for determining whether a NONCE extracted from an AUTN by a mobile station is acceptable. In the exemplary scheme, the USIM maintains a buffer of unused nonces. The buffer has a fixed size and the nonces are stored in the buffer on a first-in first-out basis. Let L denote the maximum number of authentication vectors in a batch. Usually, L is small, e.g., L=5 in GSM. However, embodiments of the invention are possible in which L is large (or even L<5) as well. The value of the parameter L may be included in AMF. When the USIM receives a user nonce request, it generates a random number $RAND_{MS}$ and responds back to the VLR with $RAND_{MS}$ and $MAC_{MS}$, as described above in connection with step 320 of FIG. 3. The USIM computes a sequence of L nonces: $NONCE_0, NONCE_1, \ldots NONCE_{L-1}$, where $NONCE_0 = f5_k(RAND_{MS})$, $NONCE_i = f5_k(NONCE_{i-1})$, and $1 \leq i \leq L-1$. In the next user authentication request, if the integrity of (RAND, AUTN) is successfully verified (for example, at step 370 of FIG. 3), the USIM checks at step 380 whether the NONCE included in AUTN is also present in the sequence $NONCE_0, NONCE_1, NONCE_{L-1}$. NONCE is deemed to be acceptable if it is present in this sequence. In this case, the USIM removes NONCE from the sequence and adds the rest of the sequence into the buffer. NONCE is also deemed to be acceptable if it is not present in the sequence, but is present in the buffer. In this case, the USIM removes NONCE from the buffer. NONCE is rejected if it is neither in the buffer nor in the sequence.

In the exemplary scheme, the USIM stores at most L−1 nonces in the buffer corresponding to every batch of authentication vectors generated by the HE/AuC. When the number of authentication vectors in a batch is less than L, there are nonces in the buffer that are not generated by the HE/AuC. However, this fact does not present a problem, because those nonces will be moved out of the buffer eventually. Assuming that there are exactly L authentication vectors in every batch in the exemplary scheme, the L−1 nonces are moved out of the buffer as soon as all the authentication vectors in a batch are consumed. It is possible that more than one batch of authentication vectors are used in a specific VLR. The USIM, however, only needs to store L−1 nonces in the buffer, regardless of how many authentication vectors have been used by the VLR.

Assuming, in the exemplary scheme, that the user visits R different VLRs during a certain period of time and that authentication data is not transferred among the visited VLRs, the number of unused nonces stored in the buffer is at most R*(L−1) for the R visits. For example, assuming that L=5, R=10, and each nonce consists of 6 bytes, the USIM would only need a buffer of 240 bytes to store the unused nonces while visiting 10 different VLRs or SNs.

In one class of embodiments, the Mobile Station 10 may store information in connection with generated nonces identifying the serving networks in connection with which the nonces were generated and used. For example, if nonce A was generated in connection with services obtained by the user in Serving Network 30, and nonce B was generated in connection with services obtained by the user in Serving Network 50, then the Mobile Station 10 may store information associating nonce A with Serving Network 30 and nonce B with Serving Network 50 in its memory or memory device. Alternatively or additionally, Mobile Station 10 may store the nonces generated in connection with each serving network it visits in separate buffers. Mobile Station 10, to determine whether an authentication vector from a serving network is fresh, may determine whether the nonce extracted from the authentication vector is an element of or derivable (using, for example, the discussed method for generating a new nonce from a current nonce, or multiple iterations of that method) from the set of one or more stored nonces associated with that serving network. In this way, the movement of Mobile Station 10 between different serving networks will not lead to mismatches of the counters and spurious resynchronization requests, unlike the case with previously known methods.

In some embodiments of the class discussed above, Mobile Station 10 may store only a single nonce for each serving network it visits. Then, subsequent nonces associated with a visited serving network would be derivable (using, for example, the discussed method for generating a new nonce from a current nonce, or multiple iterations of that method) from the stored single nonce. Thus, Mobile Station 10 may determine whether an authentication vector from a previously visited serving network is sufficiently fresh by deriving a set of nonces from the single stored nonce (using, for example, the method discussed earlier for generating a new nonce from a current nonce) associated with that serving network and evaluating whether the nonce extracted from the authentication vector is an element of the set. If the extracted nonce is in this set, then Mobile Station 10 may determine that the authentication vector is sufficiently fresh. If not, then Mobile Station 10 may determine that the authentication vector is not fresh and may reject the authentication vector.

4. Security Against Active Attacks

The security of the nonce-based AKA against denial-of-service attacks and attacks in an unprotected PLMN is considered below.

4.1 Denial-of-Service Attacks

An attacker may launch a denial-of-service attack in the air interface by sending bogus messages to the user or to the VLR. Consider the scenario that, immediately after the VLR sends a user nonce request to the user, the attacker sends a bogus user nonce request to the same user. The bogus user nonce request may be a previous message sent by the VLR. Upon receipt of the user nonce request from the VLR, the USIM generates a random number $RAND_{MS}$ and sends a user nonce response back to the VLR, as discussed in connection with step 320 of FIG. 3. The USIM next builds a list or computes a set of nonces. After receiving the bogus user nonce request from the attacker, the USIM may generate another random number $RAND'_{MS}$ and send a user nonce response back to the attacker. The attacker, at this point, may drop the response. The USIM, however, may build a new nonce list based on $RAND'_{MS}$ and delete the list based on $RAND_{MS}$. As a result, authentication failures may occur in the USIM in connection with the authentication vectors ordered by the VLR. To counter this type of attack, the USIM can re-send the random number $RAND_{MS}$ for any newly received user nonce request until an authentication vector based on $RAND_{MS}$ is accepted, instead of generating an new random number $RAND'_{MS}$.

4.2 Active Attacks in Unprotected PLMN

As discussed earlier, it is possible, in the known sequence number-based AKA, for an attacker to launch an active attack in an unprotected PLMN to obtain an arbitrary number of fresh authentication vectors for a user, independent of the actual location of the user. For the nonce-based AKA, in order to obtain a batch of authentication vectors for a user, the attacker would need to concoct a valid $MAC_{MS}$ for FRESH and $RAND_{MS}$. In addition, the nonces included in the authentication vectors that an attacker causes to be generated would need to be found acceptable by the USIM. These additional requirements provide greater security against attacks in the nonce-based AKA compared to the situation in the previously known, sequence number-based UMTS AKA.

If, by chance, the attacker has knowledge of the actual location of the user, it may be possible for the attacker to obtain fresh authentication vectors through an active attack in an unprotected PLMN, in the nonce-based AKA. Assume that the PLMN of the serving network is protected and also assume that the serving network has established a secure channel with the HLR in the home network. In that case, the attacker would only be able to monitor the traffic in the air interface between the user and the serving network. By intercepting a nonce request message from the VLR to the user's mobile station, the attacker may obtain the random number FRESH included in the message and wait for the response from the user device to the VLR that includes the corresponding nonce. After intercepting the nonce response message from the user's mobile station that includes $RAND_{MS}$ and $MAC_{MS}$, the attacker may immediately send an authentication data request for the user to the user's HLR/AuC through an unprotected PLMN using the intercepted information. However, unlike the case for the previously known, sequence number-based AKA, the attacker may obtain only a limited number of authentication vectors for the user using this type of attack. Moreover, this type of attack relies largely on the knowledge of the actual location of the user. If the attacker loses track of the location of the user, the attacker will be unable to obtain fresh authentication vectors for the user through interceptions of communications between the user and the serving network. With proper protection of information regarding the location of the user, the risk for this type of attack may be greatly reduced in comparison with that for the previously known UMTS AKA.

Figure 4:
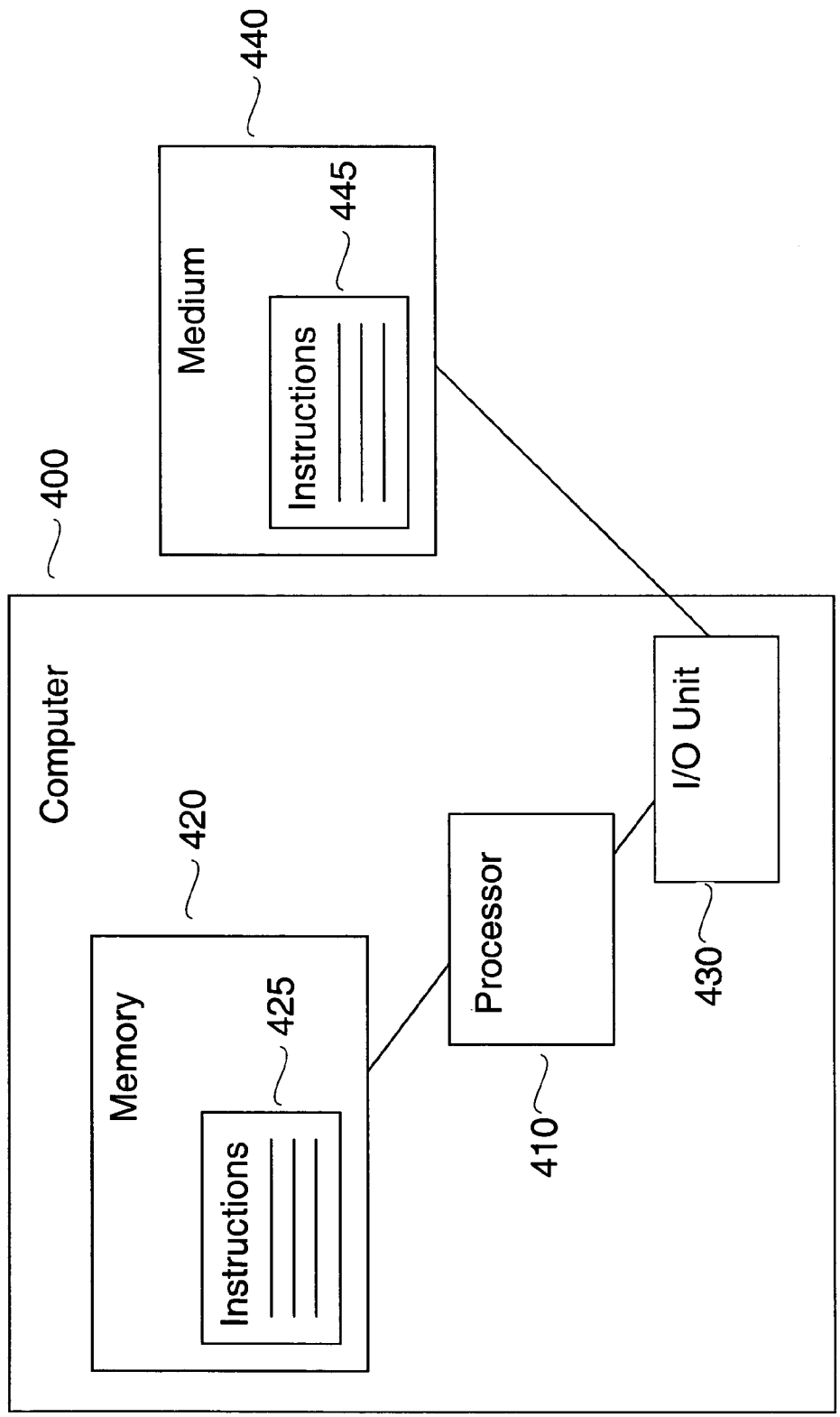
FIG. 4 shows a computer-implemented apparatus embodiment of the present invention and an embodiment incorporating a computer-readable medium.

FIG. 4 shows an example of an apparatus used in some embodiments of the present invention. In FIG. 4, a medium 440 containing Instructions 445 may be operatively coupled to a Computer 400. For example, Instructions 445 may contain the steps in an embodiment of a method of the present invention. In particular, Instructions 445 in a specific implementation may comprise the instructions corresponding to the steps shown in FIG. 3. In the example depicted in FIG. 4, Computer 400 contains a Processor 410 which is coupled to an Input/Output Unit 430 and a Memory 420. Memory 420 may also have Instructions 425, which correspond to the steps in an embodiment of a method of the present invention. In a specific implementation, Instructions 445 of Medium 440 may be copied into Memory 420.

Propagating signals embodied in a medium, such as a carrier wave or other carrier medium, that are products of embodiments of methods of the invention, or products of the use of embodiments of systems or devices of the present invention, are within the scope and spirit of the present invention and the appended claims.

The structures shown and discussed in apparatus embodiments of the invention are exemplary only and the functions performed by these structures may be performed by any number of structures. For example, the functions performed by the units shown in FIG. 1 (e.g., the HLR/AuC, HLR, VLR) and FIG. 4 may be performed by a single physical unit, or may be allocated across any number of different physical units. All of such possible variations are within the scope and spirit of embodiments of the invention and the appended claims.

The present invention has been described in terms of several embodiments solely for the purpose of illustration. Persons skilled in the art will recognize from this description that the invention is not limited to the embodiments described, and may be practiced with modifications and alterations limited only by the spirit and scope of the appended claims which are intended to cover such modifications and alterations, so as to afford broad protection to the invention and its equivalents.

What is claimed is:

1. A wireless network authentication method comprising:
   (a) receiving an initial nonce value and a mobile station message authentication code value from a serving mobile network in an authentication data request associated with a user device, the initial nonce value originating from the user device and the message authentication code value is determined at the mobile station from data originating from the user device and data originating from the serving mobile network;
   (b) generating a subsequent nonce value from the initial nonce value based on a first authentication function that is shared with the user device;
   (c) generating an authentication vector associated with the user device, the authentication vector including the subsequent nonce value;
   (d) transmitting the authentication vector to the serving mobile network
   (e) receiving an International Mobile Station Identifier corresponding to the user device from the serving mobile network
   (f) receiving a visiting location register randomized authentication value, a mobile station randomized authentication value and a mobile station message authentication value from the serving mobile network;
   (g) generating an authentication center message authentication value based on the visiting location register randomized authentication value, the mobile station randomized authentication value and a second authentication function that is shared with the user device;
   (h) determining whether the authentication center message authentication value equals the mobile station message authentication value before the transmitting step
   (i) generating an authentication center challenge randomized value; and
   (j) generating an authentication center expected response value comprising evaluating a third authentication function with the authentication center challenge randomized value as input;
   and wherein the third authentication function is shared with the user device.

2. The method of claim 1 wherein the step of generating the authentication center message authentication value comprises evaluating the second authentication function with the visiting location register randomized authentication value and the mobile station randomized authentication value as inputs.

3. The method of claim 1 wherein the authentication vector comprises the authentication center challenge randomized value and the authentication center expected response value.

4. The method of claim 3 wherein the authentication vector further comprises a UMTS-standard cipher key and a UMTS-standard integrity key.

5. The method of claim 4 wherein the first authentication function, the second authentication function and the third authentication function are UMTS-standard functions.

6. A wireless network authentication apparatus comprising:
   (a) means for receiving an initial nonce value and a mobile station message authentication code value from a serving mobile network in an authentication data request associated with a user device, the initial nonce value originating from the user device and the mobile station message authentication code value is determined at the mobile station from data originating from the user device and data originating from the serving mobile network;
(b) means for generating a subsequent nonce value from the initial nonce value based on a first authentication function that is shared with the user device;
(c) means for generating an authentication vector associated with the user device, the authentication vector including the subsequent nonce value;
(d) means for transmitting the authentication vector to the serving mobile network
(e) means for receiving an International Mobile Station Identifier corresponding to the user device from the serving mobile network
(f) means for receiving a visiting location register randomized authentication value, a mobile station randomized authentication value and a mobile station message authentication value from the serving mobile network;
(g) means for generating an authentication center message authentication value based on the visiting location register randomized authentication value, the mobile station randomized authentication value and a second authentication function that is shared with the user device; and
(h) means for determining whether the authentication center message authentication value equals the mobile station message authentication value before the transmitting step
(i) means for generating an authentication center challenge randomized value; and
(j) means for generating an authentication center expected response value comprising evaluating a third authentication function with the authentication center challenge randomized value as input;
and wherein the third authentication function is shared with the user device.

7. The apparatus of claim 6 wherein the means for generating the authentication center message authentication value comprises evaluating the second authentication function with the visiting location register randomized authentication value and the mobile station randomized authentication value as inputs.

8. The apparatus of claim 6 wherein the authentication vector comprises the authentication center challenge randomized value and the authentication center expected response value.

9. The apparatus of claim 8 wherein the authentication vector further comprises a UMTS-standard cipher key and a UMTS-standard integrity key.

10. The apparatus of claim 9 wherein the first authentication function, the second authentication function and the third authentication function are UMTS-standard functions.

11. A computer-readable medium housing stored thereon instructions, which when executed by a processor, cause the processor to perform a method comprising:
(a) receiving an initial nonce value and a mobile station message authentication code value from a serving mobile network in an authentication data request associated with a user device, the initial nonce value originating from the user device and the mobile station message authentication code value is determined at the mobile station from data originating from the user device and data originating from the serving mobile network;
(b) generating a subsequent nonce value from the initial nonce value based on a first authentication function that is shared with the user device;
(c) generating an authentication vector associated with the user device, the authentication vector including the subsequent nonce value;
(d) transmitting the authentication vector to the serving mobile network
(e) receiving an International Mobile Station Identifier corresponding to the user device from the serving mobile network
(f) receiving a visiting location register randomized authentication value, a mobile station randomized authentication value and a mobile station message authentication value from the serving mobile network;
(g) generating an authentication center message authentication value based on the visiting location register randomized authentication value, the mobile station randomized authentication value and a second authentication function that is shared with the user device; and
(h) determining whether the authentication center message authentication value equals the mobile station message authentication value before the transmitting step
(i) generating an authentication center challenge randomized value; and
(i) generating an authentication center expected response value comprising evaluating a third authentication function with the authentication center challenge randomized value as input;
and wherein the third function is shared with the user device.

12. The computer-readable medium of claim 11 wherein, in the method, the step of generating the authentication center message authentication value comprises evaluating the second authentication function with the visiting location register randomized authentication value and the mobile station randomized authentication value as inputs.

13. The computer-readable medium of claim 11 wherein the authentication vector comprises the authentication center challenge randomized value and the authentication center expected response value.

14. The computer-readable medium of claim 13 wherein the authentication vector further comprises a UMTS-standard cipher key and a UMTS-standard integrity key.

15. The computer-readable medium of claim 14 wherein the first authentication function, the second authentication function and the third authentication function are UMTS-standard functions.

* * * * *